UNITED STATES PATENT OFFICE.

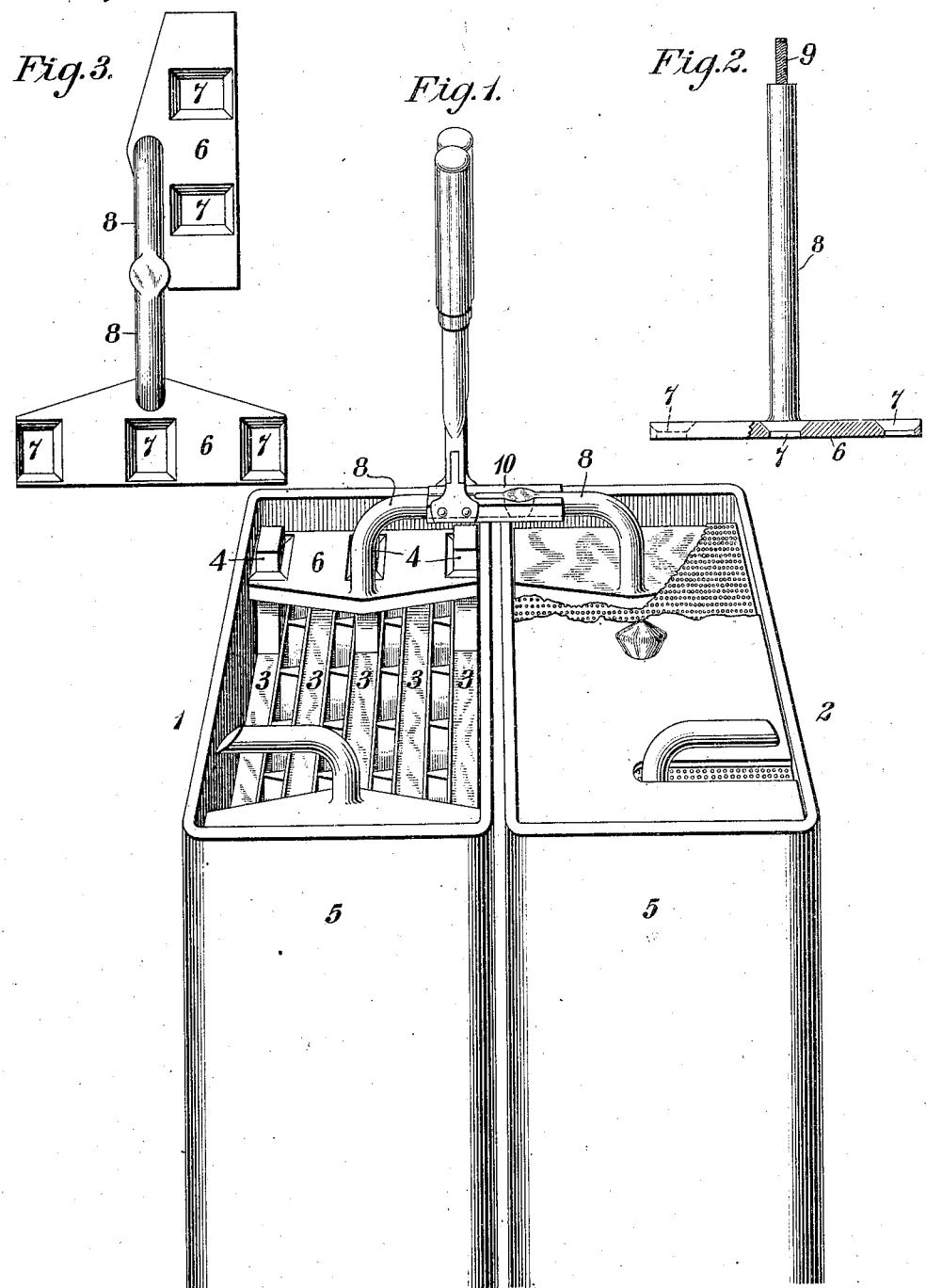

LOUIS H. FLANDERS, OF WILKINSBURG, PENNSYLVANIA, ASSIGNOR TO THE WESTINGHOUSE MACHINE COMPANY, A CORPORATION OF PENNSYLVANIA.

STORAGE BATTERY.

937,586. Specification of Letters Patent. Patented Oct. 19, 1909.

Application filed August 6, 1904. Serial No. 219,787.

*To all whom it may concern:*

Be it known that I, LOUIS H. FLANDERS, a citizen of the United States, and a resident of Wilkinsburg, in the county of Allegheny and State of Pennsylvania, have invented a new and useful Improvement in Storage Batteries, of which the following is a specification.

My invention relates to secondary or storage batteries, and more particularly to means for joining the plates of a cell having the same polarity and for connecting the plates of one cell to those of another, and it has for its object to provide simple, convenient and efficient means for this purpose.

In order to minimize the cost and to facilitate the manufacture and repair of secondary or storage batteries, it is exceedingly important that simple means be provided for joining plates of like polarity and for connecting groups of one cell with the proper groups of others. Heretofore, the labor and expense incident to the removing of one or more cells from a battery for the purpose of cleaning or repairing, or for other reasons, have been excessive, and the operation of re-connecting the cells in the batteries has been a difficult one, owing to the fact that the connecting means have generally been complicated or difficult of application.

My invention is illustrated in the accompanying drawing, in which—

Figure 1 is a view, in perspective, of the upper portions of two cells of a secondary battery to which my invention is applied. Fig. 2 is a view, partially in elevation and partially in section, of the connecting means comprising my invention, and Fig. 3 is a plan view of two connectors joined together.

Each of the cells 1 and 2 comprises groups of electrodes or plates 3 having lugs 4 which project from their upper ends. The plates of one polarity are so arranged in the cases that their projecting lugs are all located at one side, and the plates of opposite polarity are so arranged that their lugs are all located at the opposite side of the cases. A connecting plate 6 has countersunk apertures 7 so spaced and of such dimensions that when applied to the cell the lugs 4 just fit into the apertures and project through them. By means of a blow-pipe, the portions of the lugs which project through the apertures may be burned or melted until the lugs and the plate are securely united.

Each of the plates 6 is provided with a terminal lug 8 having a core 9 of copper cable or other suitable conducting material of less ohmic resistance and greater tensile strength than that of the surrounding material, which ordinarily will be composed of lead or a lead compound, the object of the copper core being to increase the strength and conductivity of the terminal connections between the cells and between the batteries and the external circuit and to reduce the weight thereof.

After the battery plates have been assembled in their cases and securely united, as before described, the cells may be arranged as may be found most convenient and desirable and then the lugs 8 may be bent so as to form the shortest connection between the positive plates of one cell and the negative plates of another or adjacent cell. The lugs are cut so that their ends abut, and by means of a mold or special tool 10 provided for that purpose, which fits snugly about the abutting ends of the lugs 8, a blow-pipe flame and a small amount of extra lead, the lugs may be properly united.

It is not at all necessary to arrange the cells of a battery as shown in Fig. 1, as may be understood by referring to Fig. 3, in which only the connecting plates 6 and their lugs 8 are shown. The cells may be arranged side by side, end to end or in any other desired manner. If it is desired to disconnect a cell from the battery, it is only necessary to cut the connection between the two cells at the point where they were previously united, and if it is desired to return the cell to the battery at a subsequent time, the ends of the lugs 8 may be united as before described, no more difficulty being experienced than when first united, and it is this feature which I claim as one of the special advantages of the connecting means constituting my present invention. It is to be understood that the lugs 8 may be utilized in the manner and for the purpose described, either with or without cores of different material, and that other variations may be made, if desired.

I claim as my invention:

1. In combination with the electrodes of a storage battery, a connecting plate autogenously connected to the electrodes of like polarity and provided with a flexible terminal lug formed integrally therewith an provided with a core of greater conductivity and tensile strength than the surrounding material and adapted to be bent to the right, left or directly back for the purpose of autogenously connecting the surrounding material with the surrounding material of a similar lug of an adjacent cell.

2. In combination with the electrodes of a storage battery, a connecting plate autogenously connected to the electrodes of like polarity and provided with a flexible terminal lug formed integrally therewith and provided with a core of greater conductivity and tensile strength than the surrounding material and adapted to be bent in any direction for the purpose of autogenously connecting the surrounding material with the surrounding material of a similar lug of an adjacent cell.

3. In a storage battery cell, the combination with the electrodes of a plate autogenously connected to the electrodes of like polarity, a symmetrical terminal lug integrally formed with said plate and symmetrically located with reference to the sides of the cell so that it may be bent in any direction to be autogenously connected to a similar terminal lug on the next adjacent cell.

4. In a storage battery cell, the combination with the electrodes of a plate autogenously connected to the electrodes of like polarity, a symmetrical terminal lug integrally formed with said plate and symmetrically located with reference to the sides of the cell so that it may be bent in any direction to be connected to a similar terminal lug on the next adjacent cell.

In testimony whereof, I have hereunto subscribed my name this 29th day of July 1904.

L. H. FLANDERS.

Witnesses:
WESLEY G. CARR,
BIRNEY HINES.